United States Patent
Scholz (10) Patent No.: US 8,078,550 B2
(45) Date of Patent: Dec. 13, 2011

(54) SELF LEARNING TO SUPPORT NAVIGATION TO CORRECT AN INCONSISTENT PROPERTY

(75) Inventor: Martin Scholz, Nussloch (DE)

(73) Assignee: SAP AG, Walldorf (DE)

( * ) Notice: Subject to any disclaimer, the term of this patent is extended or adjusted under 35 U.S.C. 154(b) by 1047 days.

(21) Appl. No.: 11/987,468

(22) Filed: Nov. 30, 2007

(65) Prior Publication Data
US 2009/0144335 A1    Jun. 4, 2009

(51) Int. Cl.
*G06F 15/18* (2006.01)
(52) U.S. Cl. .......................................... 706/12
(58) Field of Classification Search ................. 706/12
See application file for complete search history.

(56) References Cited

U.S. PATENT DOCUMENTS
2005/0004780 A1 * 1/2005 Lin et al. ........................ 702/184
* cited by examiner

*Primary Examiner* — Michael B Holmes
(74) *Attorney, Agent, or Firm* — Kenyon & Kenyon LLP (57) ABSTRACT

Methods and systems for maintaining objects using computer self-learning to determine which user interface (UI) screen to navigate to for correcting an inconsistent property of an object are presented. In an embodiment, a data class module is used by the computer system for accessing an object's properties. When the data class is called to store/update an object's properties, the data class determines which UI screen is active, and which of the properties of the data class is being stored/updated. The data class uses the UI screen and property to maintain a screen relationship table between an object's properties and which UI screen writes the object's properties. In an embodiment, the data class module contains a method for performing a consistency check by applying consistency rules to an object.

19 Claims, 5 Drawing Sheets

SELF LEARNING TO SUPPORT NAVIGATION TO CORRECT AN INCONSISTENT PROPERTY

BACKGROUND

The present invention relates to maintaining objects and, more particularly, to maintaining objects using a computer self learning method to build a table for determining which user interface (UI) screen to navigate to for enabling a user to enter new data for a property of an object with inconsistent data. The data of the object is determined to be inconsistent by the application of a set of rules that place constraints on the values of the data.

Object oriented programming is often used to implement large computer software systems such as customer relationship management software. Objects in object oriented computer software systems are collections of properties (or fields) and methods (or modules or computer code). The properties or fields are working data of the computer system. The methods are computer code for executing on the working data of the properties. Often objects can be very large with numerous properties or fields for holding working data of the computer software system. For example, an object for an employee may contain a property (or field) for the name of the employee, a property for the salary of the employee, a property for the work history of the employee, a property for the address of the employee, etc. An object in a customer relationship management system may have thousands of properties.

UI screens present an object's properties or data to a user and provide the user the ability to enter new data for an object's properties. Many different UI screens may write to an object's properties, and the UI screens may be frequently changed to accommodate new programming requirements. Often, objects are maintained using a set of consistency rules that specify constraints on the values that the object's properties can take. The consistency rules are often not applied when the values for the object's properties are entered using the UI screens, but rather are applied to the object's properties during a separate maintenance operation performed by the computer system. When a property of an object is found to be inconsistent with the consistency rules, this means the value of the property is not an acceptable value and thus needs to be changed. A UI screen needs to be presented to a user to allow the user to correct the value of the property to remove the inconsistency. It may be difficult to determine which UI screen to navigate to for correcting inconsistent data of an object for many reasons including the UI screens may be changing constantly, new properties may be added to the object, and new consistency rules may be added.

Figure 1:
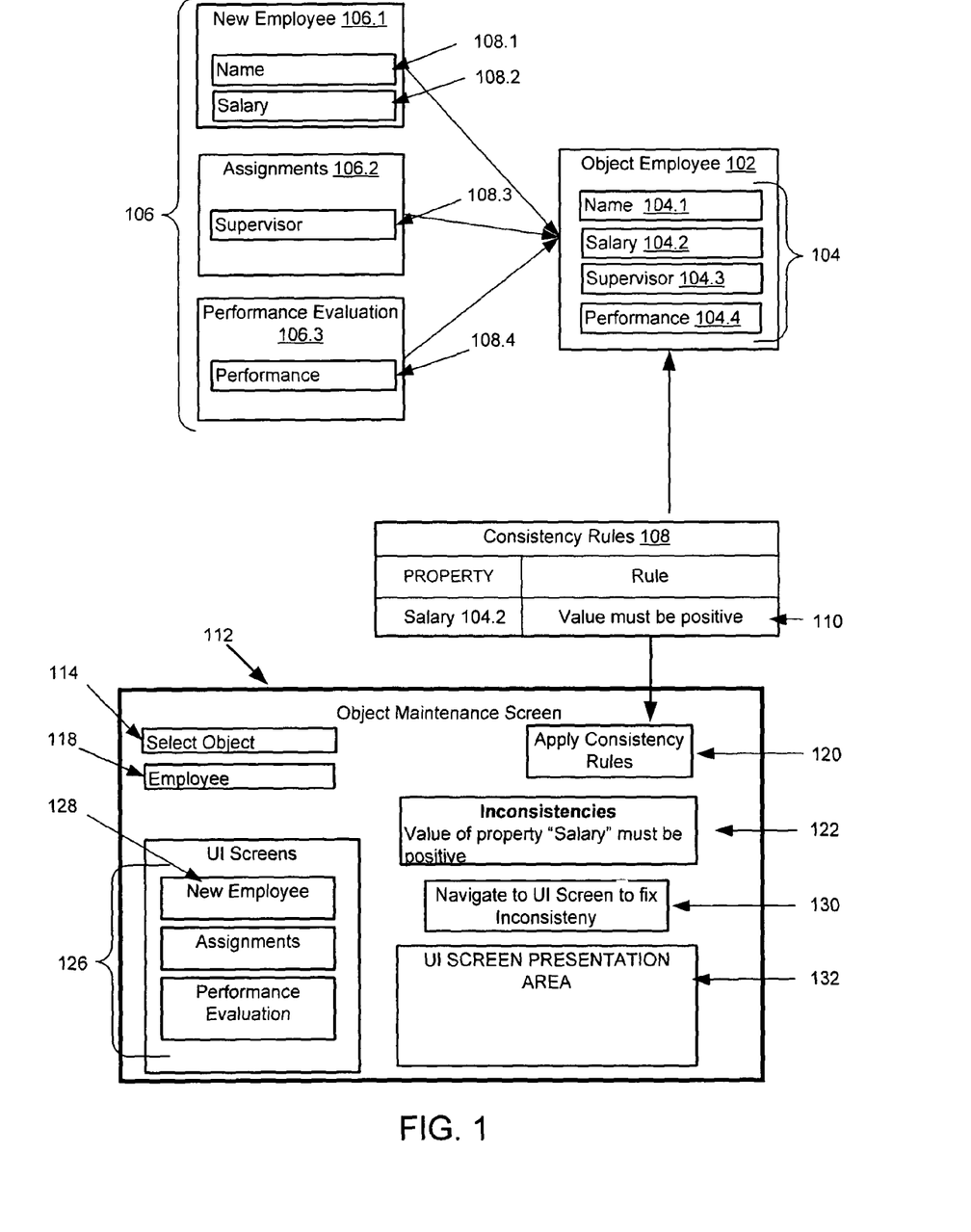
FIG. 1 illustrates known techniques for maintaining an object of a computer software system.

FIG. 1 illustrates known techniques for maintaining an object 102 of a computer software system. The object employee 102 is a collection of properties 104 of a computer software system. The properties 104 are working data for the computer software system. For example, the name property 104.1 may be named "Name" and may be the name of the employee represented by the employee object 102. A computer system may have UI screens 106 defined for it for displaying and setting the values of the properties 104 of the object employee 102. For example, UI screen 106.1 may include a field "Name" 108.1 which enables a user to enter a value for the property "Name" 104.1 of the object employee 102 and enables the user to issue a command that causes the computer system to write the new value for property "Name" 104.1 to computer storage. The UI screens 106 may be changed and the properties 104 that can be changed from a particular UI 106 may change. So, for example, as illustrated UI screen 106.1 includes the field "Salary" 108.2 to change the value of property "Salary" 104.2 of the object employee 102, but the UI screen 106.1 may be changed as part of updating the computer software system so that the UI screen 106.1 no longer includes the field salary 108.2 to change the value of the property "Salary" 104.2 of the object employee 102. For example, the field "Salary" 108.2 for the property "Salary" 104.2 may be moved to the assignments UI screen 106.2.

The computer software system may include consistency rules 108 which define constraints on the values that the object properties 104 should contain. An example consistency rule 110 may be that the value of the object employee 102 property "Salary" 104.2 has to be positive.

The computer software system may include an object maintenance screen 112 for a user to maintain objects 102. The maintenance screen 112 may include a selection object button 114 for selecting which object 102 to maintain, and a selected object field 118 for displaying the selected object 118. The maintenance screen 112 may further include an apply consistency rules button 120 that causes the computer system to apply the consistency rules 108 to the selected object 118 and an inconsistencies area 122 to display inconsistencies with the selected object 102. For example, if the object employee 102 was selected in area 118, and the apply consistency rules button 114 was selected to perform a consistency check on the object employee 102, then the consistency rule 110 would be applied to object employee 102 and any inconsistencies would be displayed in inconsistencies area 122. For example, if the property "Salary" 104.1 had a value of zero or a negative value, then the consistency rule 110 would not be satisfied and a message reporting that the value of the property "Salary" 104.2 is inconsistent or needs to positive would be displayed in the inconsistencies area 122. The user needs a way to navigate to the UI screen 106 where the value of the property "salary" 104.2 can be changed in order to correct the inconsistency.

The object maintenance screen 112 may include a list of the UI screens 126 that are associated with the object 102. The user may for example, select the button for the UI screen "New Employee" 128 and be taken to the UI screen "New Employee" 106.1 by the computer system. The computer system may present the UI screen "New Employee" 106.1 in the area 132. However, which UI screen 106 contains property "salary" 104.2 may not be known by the user. There may be a button "Navigate to UI screen to fix Inconsistency" 130 for the computer system to navigate to the UI screen 106 to enable the user to correct the inconsistency, but determining which UI screen 106 to navigate to is difficult, because the UI screens 106 may frequently be changed, and because hard coding which UI screen 106 to navigate to is burdensome and error prone.

Accordingly, there is a need in the art for a system and method of maintaining objects 102 with computer self learning of which UI screen 106 to navigate to for correcting inconsistent object properties 104.

DETAILED DESCRIPTION

The present invention is a computer system and method for maintaining objects using a self-learning method to maintain a table for the computer system to determine which user interface (UI) screen to navigate to for enabling a user to correct an inconsistent property of an object. In an embodiment, the computer system uses a data class module for accessing an object's properties. When the data class is called to access an object's properties, the data class determines which UI screen is calling the data class, and which of the properties of the data class the UI screen is requesting be written. The data class uses the UI screen and property to maintain a screen relationship table between an object's properties and which UI screen writes the object's properties. The screen relationship table can be used to provide to the user the functionality to navigate to a UI screen where an object's property value can be changed in order to correct inconsistencies.

Figure 2:
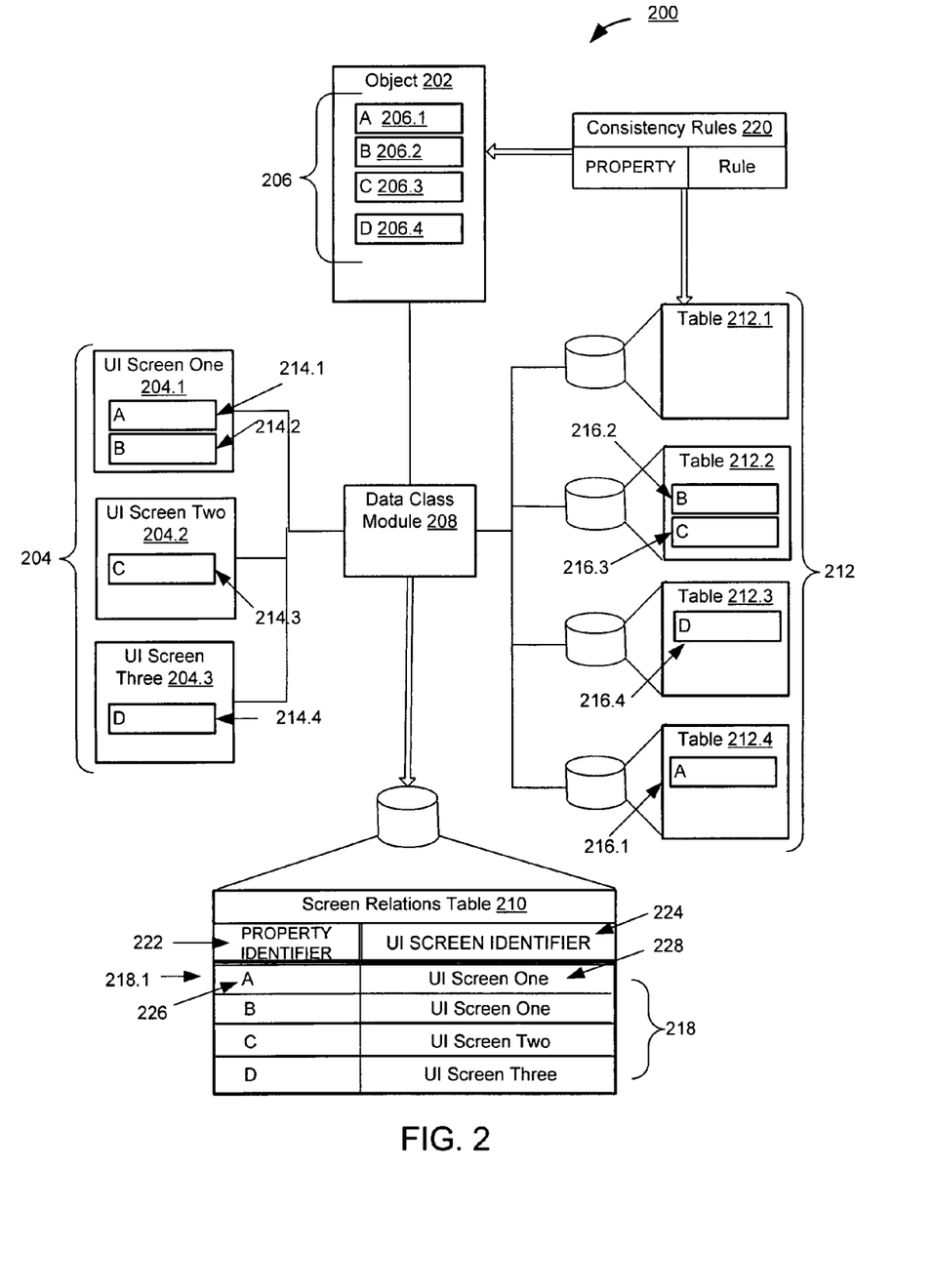
FIG. 2 illustrates an embodiment of a system for maintaining objects using a self-learning method to maintain a table for the computer system to determine which user interface (UI) screen to navigate to for enabling a user to correct an inconsistent property of an object.

FIG. 2 illustrates an embodiment of a system 200 for maintaining objects 202 using a self-learning method to maintain a table for the computer system to determine which user interface (UI) screen 204 to navigate to for enabling a user to correct an inconsistent property of an object 202.

The system 200 may include one or more objects 202, defined UI screens 204, consistency rules 220, storage 212, a screen relations table 210, and a data class module 208. As discussed, the data objects 202 store working data of the computer system 200 and each object 202 may be organized into a group of properties 204, each property 204 may store working data. The UI screens 204 define display elements that permit system operators to enter commands and data to the computer system to control its operation. The consistency rules 220 store rules that can be applied to the properties 206 of the objects 204 to produce an outcome of whether the property 206 violates the consistency rules 220. The data storage 212 stores the objects 206 of the computer system 200. The data storage 212 may be a type of persistent computer memory, e.g. a hard-drive. The screen relations table 210 stores the relationship between the properties 206 of the objects 204 and the UI screens 204. The computer system uses screen relations table 210 to determine which of the UI screens 204 enables a user to enter a new value for a property 206. The data class module 208 is a class of the object system for computer software system.

The system 200 includes an object 202 which may be a collection of properties or fields for data in a computer software system. The object 202 may be a collection of properties for an employee. The object 202 may be very large with many properties 206 so that no one UI screen 204 could conveniently display all the properties 206 of the object 202. As illustrated, the object 202 includes four properties A 206.1, B 206.2, C 206.3, and D 206.4. The system 200 may include consistency rules 220. The consistency rules 220 are applied to the values of the properties 206 of the object 202. Those properties 206 that do not comply with the consistency rules 220 are inconsistent properties 206. In an embodiment, the consistency rules 220 may also be applied to the representation of properties 206 in the database tables 212. The object 202 may be a member of the data class module 208. The data class module 208 is a class of the object system for computer software system. The data class module 208 is used by the UI screens 204 to access and store the properties 206 of the object 202. The data class module 208 also builds and maintains the screen relations table 210, which is used to determine which UI screen 204 to navigate to for correcting an inconsistent property 206 of an object 202. The properties 206 may be stored in the storage 212 such as in the database tables 212. The property B 206.2 is stored in the storage location 216.2 of the database table 212.2 and the property C 206.3 is stored in the storage location 216.3 of the database table 214.2. The property D 206.4 is stored in the storage location 216.4 of the database table 212.3. The properties A 206.1 is stored in the storage location 216.1 of the database table 212.4. One skilled in the art will appreciate that the storage 212 may be organized differently and does not necessarily require databases.

The system 200 includes the UI screens 204 which may display the value of the properties 206 and enable the user to enter new values for the properties 106. The UI screens 204 may be developed for applications that are part of the computer software system and the UI screens 204 may be changed. The UI screens 204 may include the fields 214 for changing properties 206 of an object 202. For example, the UI screen One 204.1 includes field 214.1 for changing the property A 206.1 of the object 202 and the field 214.2 for changing the property B 206.2 of the object 202. The UI screen Two 204.2 includes the field 214.3 for changing the property C 206.3 of the object 202. The UI screen Three 204.3 includes the field 214.4 for changing the property D 206.4 of the object 202.

The system 200 may include screen relations table 210 which may be a database table of rows 218 for storing relationships between properties identifiers 222 of objects 202 and UI screens identifiers 224. For example, the row 218.1 of screen relations 210 contains an entry for property A identifier 226, which may be an identifier that would enable a computer program to compare a property 206 of an object 202 to the identifier 226 to determine if the identifier 226 represents the property 206, and the row 218.1 contains an entry for UI screen One identifier 228 which may be an identifier that would enable a program to execute UI screen One 204.1. The maintenance screen of FIG. 1 (button 130) could use the screen relations 210 to execute the UI screen One 204.1 so that a user could fix an inconsistent value of the property A 206.1.

In an embodiment, the data class module 208 builds and maintains the screen relations table 210. When the computer system in response to a command from a user of a UI screen 204 to write/update the contents of an object 202, e.g. property 206, the computer system uses the data class module 208 to write the property 206 of the object 202. The data class module 208 may determine an identifier for the UI screen 204 that requested the write operation. The data class module 208 may call an operating system function (not illustrated) to determine an identifier for the UI screen 204. The data class module 208 will then determine the property 206 that is being requested to be written to data storage 212. To determine the property 206 that is being requested to be written to data storage 212, the data class module 208 may use information that the UI screen 204 passes to the data class module 208 as part of the request. Then, the data class module 208 will update the screen relations table 210 with a row 218 for each property 206 that is being requested to be written, and with an identifier for the UI screen 204. One skilled in art will recognize that the data class module 208 does not need to be called directly by the UI screen 204 to perform this functionality, and that the data class module 208 may build the screen relations table 210, with fields from the database tables 212 rather than the properties 206.

The data class module 208 may include a check-method for applying the consistency rules 220 to the object 202. The check-method of the data class module 208 may return at least an inconsistency message, a UI screen if one is available, a property, and a severity level.

Figure 3:
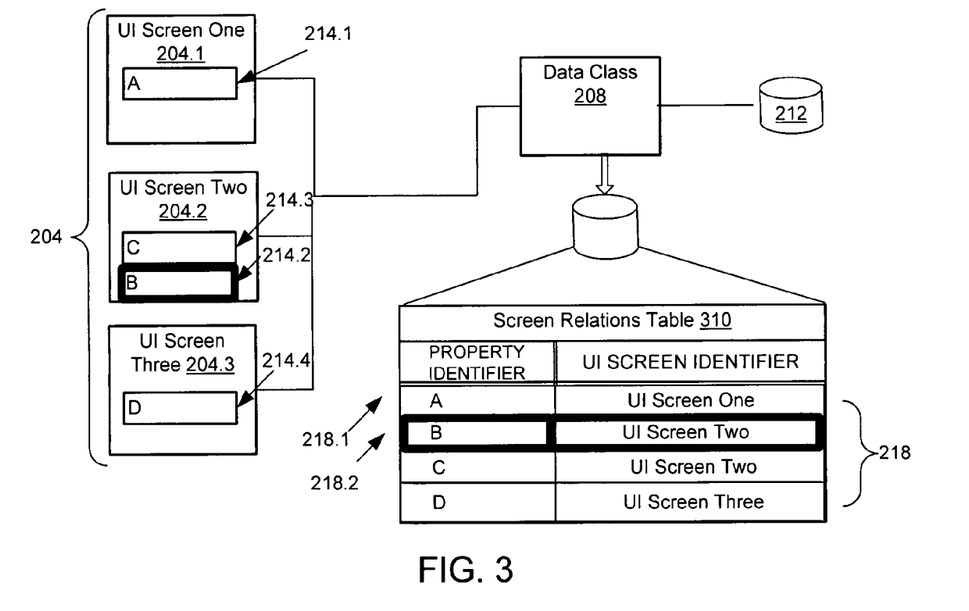
FIG. 3 illustrates the operation of an embodiment of the computer self-learning method to maintain a screen relations table when a property is moved from one UI screen to another UI screen.

FIG. 3 illustrates the operation of an embodiment of the computer self-learning method to maintain a screen relations table when a property 206 is moved from one UI screen 204 to another UI screen 204. In FIG. 3, the property B 206.2 has been moved to UI screen Two 204.2 from UI screen One 204.1. The move of a property 206 from one UI screen 204 to another UI screen 204 may occur in the maintenance and development of computer software systems. Screen relations table 310 has been updated by the computer system as a result of a request by a user of the UI screen Two 204.2 to write the value of property B 206.2 to data storage 212. The screen relations table 310 may not be updated manually, and the screen relations table 310 may not always contain the correct UI screen 204. For example, when the property B 206.2 was moved from UI screen One 204.1 to UI screen Two 204.2, row 218.2 is only updated once a request is received by the data class module 208 to write a value for property B 206.2 to data storage 212. If the UI screen Two 204.2 is modified without testing by writing a value for the property B 206.2 then the screen relations table 310 may contain an incorrect value. This is not considered a serious problem since the screen relations table 310 is used to navigate to a screen 204 for changing the value of a property 206. The user will be able to detect that the screen 204 does not contain the property 206, and the user will have to navigate to the correct screen 204 to change the value of the property 206. Once the user changes the value of the property 206, then the screen relations table 310 will be updated.

Figure 4:
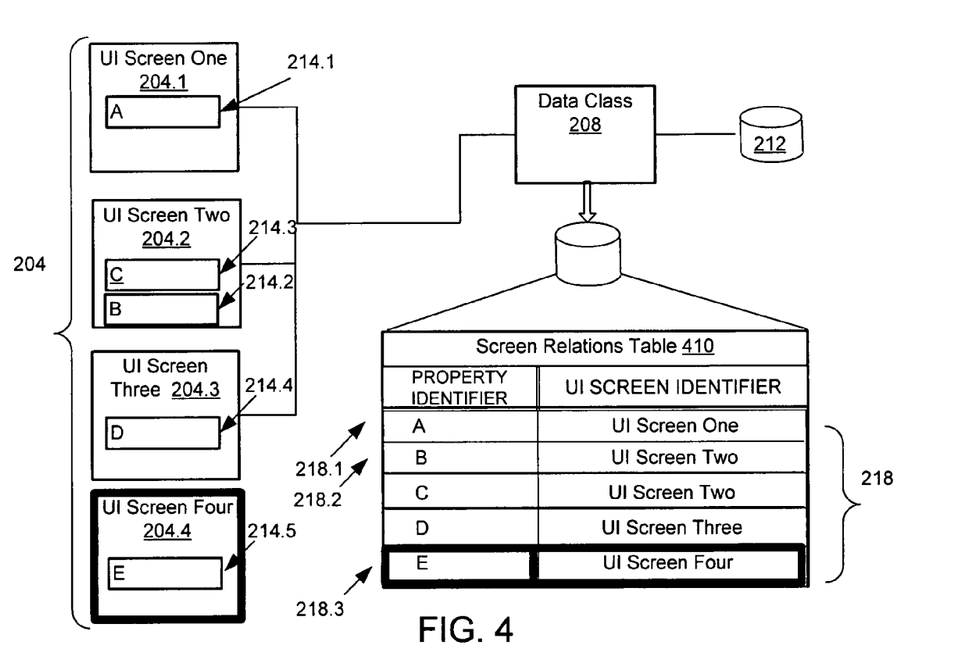
FIG. 4 illustrates the operation of the computer self-learning method to maintain screen relations table when a new UI screen and a new property are added to the computer software system.

FIG. 4 illustrates the operation of the computer self-learning method to maintain screen relations table when a new UI screen and a new property are added to the computer software system. In FIG. 4, a new UI screen Four 204.4 has been added with a new property E 214.5 of the object 202. New UI screens 204 and new properties 206 may be added in the maintenance and development of computer software systems. The screen relations table 410 has been updated with a row 218.3. The new row 218.3 was added when during the development of UI screen Four 204.4, the developer tested the UI screen Four 204.4 and the data class module 208 responded to the request to write a value for property E 206.5 by adding row 218.3 to the screen relations table 410.

Figure 5:
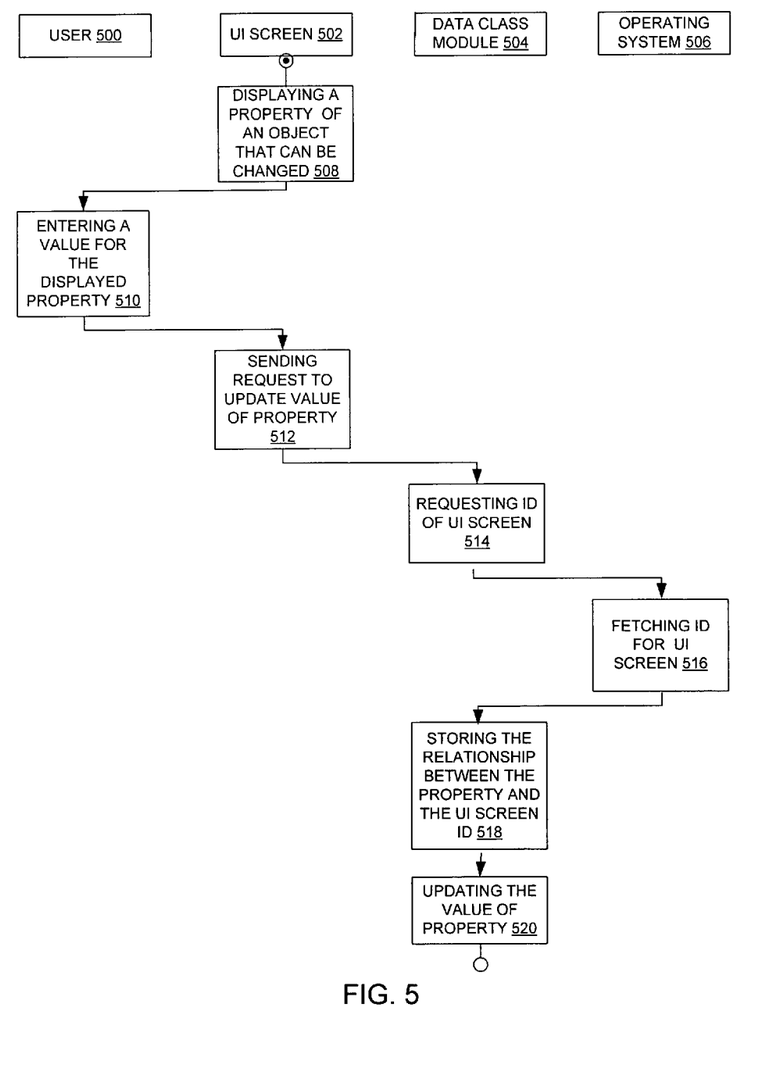
FIG. 5 illustrates the operation of an embodiment of the system with a data class module building a screen relations table and managing the storage access for UI screens.

FIG. 5 illustrates the operation of a data class module building a screen relations table and managing the storage access for UI screens. The user 500 may be a person that is using the computer software system. The UI screen 502 defines display elements that permit the user 500 to enter data to the computer system to change the value of a property of an object. The data class module 504 is a class that contains method or computer code to access the object's data. The operating system 506 is the computer code that manages the operation and resources of the physical hardware of the computer.

The flow begins with a UI screen 502 of a computer software system displaying a property of an object in a UI screen that allows a user 500 to change the value of the property 508. An example (FIG. 2) is UI screen Three 204.3 being displayed to a user 500 that permits the user 500 to change the value of property D 206.4. The flow continues with entering a value for the displayed property 510. An example (FIG. 2) is a user 500 entering a new value for property D 206.4 by using displayed UI screen Three 204.3. The flow continues with sending a request to update the value of property 512. An example (FIG. 2) is in response to a command by the user, the computer system sending a request to update the value of the property D 206.4 to the data class module 208. The flow continues with requesting ID of UI screen 514. An example (FIG. 2) is the data class module 208 sending a request to an operating system (not illustrated in FIG. 2) 506 requesting the ID of the UI screen Three 204.3 that called the data class module 208. The flow continues with fetching an ID for the UI screen 516. As is known in the art, some operating systems 506 provide the functionality to retrieve an ID of the calling module. The flow continues with updating/storing the relationship between the property and the UI screen 518. An example is (FIG. 2) data class module 208 storing row 218.1 in screen relations table 210 after UI screen One 204.1 calls data class module 208 to write a value for property A 206.1. The flow continues with updating the value of the property 520. An example is (FIG. 2) the data class module 208 writing the value of property D 206.4 into the database table 212.3.

Figure 6:
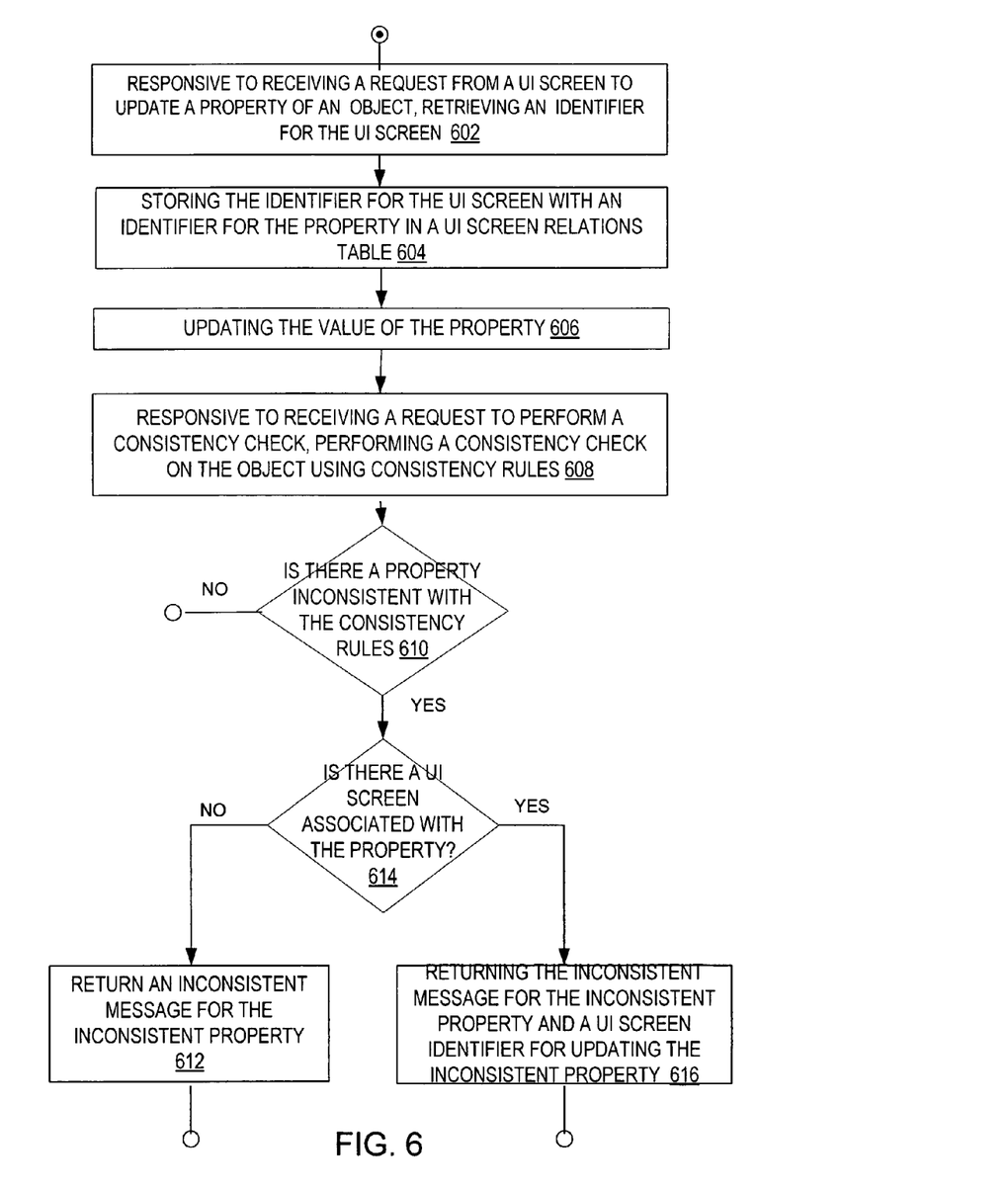
FIG. 6 illustrates an embodiment of a method for maintaining objects using a self-learning method to maintain a table for the computer system to determine which user interface (UI) screen to navigate to for enabling a user to correct an inconsistent property of an object.

FIG. 6 illustrates an embodiment of a method for maintaining objects using a self-learning method to maintain a table for the computer system to determine which user interface (UI) screen to navigate to for enabling a user to correct an inconsistent property of an object. The flow begins with responsive to receiving a request from a UI screen to update a property of an object, retrieving an identifier for the UI screen 602. The flow continues with storing the identifier for the UI screen with an identifier for the property in a UI screen relations table 604. An example is (FIG. 2) the data class module 208 storing the row 218.1 in the screen relations table 210 in response to the data class module 208 receiving a request to update the value of the property A 206.1. The flow continues with updating the value of the property 606. An example is (FIG. 2) the data class module 208 writing the value to the database table 212.4 for the property A 206.1. The flow continues with responsive to receiving a request to perform a consistency check, performing a consistency check on the object using consistency rules 608. The flow continues with is there a property inconsistent with the consistency rules 610. If there are no inconsistencies then the method may end. The flow continues with is there a UI screen associated with the property 614. An example is (FIG. 2) the screen relations table 210 can be searched to check if the row 218 has been entered for the property 206. The flow continues with if there is not a UI screen then return an inconsistent message for the inconsistent property 612. An inconsistent message may be any message relating to applying the consistency rules. The flow continues with if there is a UI screen then returning the inconsistent message for the inconsistent property and a UI screen identifier for updating the inconsistent property 616. An example is (FIG. 2) the UI screen identifier 218 can be retrieved from the screen relations table 210 with the property 206, e.g. row 218.1 for the property A 206.1. The UI screen identifier can be executed to provide to the user the ability to correct the value of the inconsistent property.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A computer implemented method for performing maintenance on an object with self-learning of user interface screens for updating object properties comprising:
    responsive to a command entered at a user interface screen to update a property of the object, retrieving an identifier for the user interface screen,
    storing the identifier for the user interface screen with an identifier for the property of the object in a screen relations table,
    thereafter updating the value of the property as commanded;
    responsive to a request to perform a consistency check on the object, comparing content of the object to predefined consistency rules, and
    returning an inconsistency message for a property of the object that is inconsistent with the consistency rules, and if the screen relations table contains a relationship for the property, then retrieving from the screen relations table a user interface screen identifier for updating the value of the property of the object.

2. The method of claim 1, further comprising: executing the user interface screen for updating the value of the property of the object.

3. The method of claim 1, further comprising:
    creating a data class for managing accessing the object property in storage;
    making the object a member of the data class; and
    accessing the object property via the data class.

4. The method of claim 3, wherein the storage includes a plurality of database tables.

5. The method of claim 4, wherein at least one consistency rule is based on a field value for the plurality of database tables.

6. The method of claim 1, wherein retrieving an identifier for the user interface screen further comprises:
    retrieving an identifier for the user interface screen from a kernel of an operating system.

7. The method of claim 1, wherein the object is part of a customer relationship management system.

8. The method of claim 3, wherein performing a consistency check further comprises:
    performing a consistency check by calling a method of the data class.

9. A computer system for maintaining an object with self-learning of user interface screens for updating object properties comprising:
    a data class module executing on a processor, wherein the data class module is configured to:
    respond to a command entered at a user interface screen to update a property of the object, by retrieving an identifier for the user interface screen,
    store the identifier for the user interface screen with an identifier for the property of the object in a screen relations table,
    compare content of the object to predefined consistency rules,
    return an inconsistency message for a property of the object that is inconsistent with the consistency rules, and if the screen relations table contains a relationship for the property, then retrieve from the screen relations table a user interface screen for updating the value of the property of the object; and
    update the value of the property as commanded.

10. The computer system of claim 9, wherein the data class module is further configured to respond to receiving a request to perform a consistency check on the object by executing the user interface screen for updating the value of the property of the object.

11. The computer system of claim 9, wherein the data class module is further configured to update the value of the property stored in a plurality of database tables.

12. The computer system of claim 9, wherein the data class module is further configured to retrieve an identifier for the user interface screen from a kernel of an operating system.

13. The computer system of claim 9, wherein the object is part of a customer relationship management system.

14. The computer system of claim 9, wherein the data class module is further configured to retrieve an identifier for the user interface screen from a kernel of an operating system.

15. A computer program product, comprising:
    a computer-readable medium comprising:
    a first set of code for causing a computer to respond to receiving a request from a user interface screen to update a property of an object, by retrieving an identifier for the user interface screen;
    a second set of code for causing a computer to store the identifier for the user interface screen with an identifier for the property in a user interface screen relations table
    a third set of code for causing a computer to perform a consistency check on the object using consistency rules;
    a fourth set of code for causing a computer to display a property of the object inconsistent with the consistency rules; and
    a fifth set of code for causing a computer to respond to a receiving a request to correct an inconsistency of the property of the object, if user interface screen relations table contains a relationship for the property, then retrieving from the user interface screen relations table a user interface screen for updating the value of the property of the object, and executing the user interface screen associated with updating the value of the property of the object, otherwise reporting there is no relation for the property in screen relations table.

16. A computer system to manage data integrity stored therein, comprising:
    a stored ruleset defining data consistency rules for data objects stored by the computer system, the ruleset storing property identifiers of the data objects and requirement definitions for the data object properties so identified,
    a screen identifier table containing table entries that store user interface screen identifiers and property identifiers,
    means for updating data in the data objects based on user input, including means to store in the screen identifier table an identifier of a data object property so updated and a user interface screen in which the user input was received, and
    means for soliciting new updated data for data objects in response to a consistency check violation, the consistency check violation having been generated by comparing data object content to the data consistency rules, the soliciting means:
    searching the screen identifier table using a property identifier of a violated consistency rule,
    on a match, retrieving a user interface screen identifier associated with the searched property identifier, and re-executing the updating means using a user interface screen identified by the user interface screen identifier.

17. A method for managing data integrity, comprising:
defining data consistency rules in a stored ruleset for data objects stored by the computer system, the ruleset storing property identifiers of the data objects and requirement definitions for the data object properties so identified,
storing, in a screen identifier table, table entries that store user interface screen identifiers and property identifiers,
updating data in the data objects based on an user input,
storing, in the screen identifier table, an identifier of a data object property so updated and a user interface screen in which the user input was received, and
comparing data object content to the defined data consistency rules in the stored ruleset, generating a consistency check violation when the comparison indicates a mismatch between the data object content and the defined data consistency rules,
searching the screen identifier table using a property identifier of the violated consistency rule,
on a match, retrieving a user interface screen identifier associated with the searched property identifier, and
re-executing the updating means using a user interface screen identified by the user interface screen identifier.

18. A method for performing maintenance on an object with self-learning of user interface screens for updating object properties comprising:
responsive to a command entered at a user interface screen to update a property of the object, retrieving an identifier for the user interface screen, wherein the object is part of a customer relationship management system;
storing the identifier for the user interface screen with an identifier for the property of the object in a screen relations table, and
thereafter updating the value of the property as commanded.

19. A computer readable storage medium embodying program instructions for causing a processor to execute a method for performing maintenance on an object with self-learning of user interface screens for updating object properties comprising:
responsive to a command entered at a user interface screen to update a property of the object, retrieving an identifier for the user interface screen, wherein the object is part of a customer relationship management system;
storing the identifier for the screen with an identifier for the property of the object in a screen relations table, and
thereafter updating the value of the property as commanded.

* * * * *